United States Patent

[11] 3,583,825

[72] Inventors Harry J. Sadler
St. Paul;
Ramon Pareja, Minneapolis, both of, Minn.
[21] Appl. No. 852,683
[22] Filed Aug. 25, 1969
[45] Patented June 8, 1971
[73] Assignee Hypro, Inc.
St. Paul, Minn.

[54] TRACTOR-MOUNTED POWER TAKEOFF DRIVEN CENTRIFUGAL PUMP
5 Claims, 5 Drawing Figs.
[52] U.S. Cl. ................................................ 415/122,
74/801, 415/204, 415/214
[51] Int. Cl. .................................................. F04d 29/02,
F04d 17/08, F16h 1/28
[50] Field of Search ........................................ 415/122,
214; 103/111 (G); 74/801

[56] References Cited
UNITED STATES PATENTS

| Re26,578 | 5/1969 | Naumann | 74/801 |
|---|---|---|---|
| 1,644,222 | 10/1927 | Baker | 74/801 |
| 1,864,256 | 6/1932 | Nordone | 74/801 |
| 2,595,942 | 5/1952 | Hasbrouck | 74/801 |
| 2,043,261 | 6/1936 | Neuland | 74/801 |
| 2,625,047 | 1/1953 | Wood | 74/801 |
| 3,090,258 | 5/1963 | Zink et al. | 74/801 |
| 3,145,912 | 8/1964 | Weis | 415/122 |

FOREIGN PATENTS

| 213,216 | 5/1955 | Australia | 74/801 |
|---|---|---|---|
| 983,624 | 2/1965 | Great Britain | 74/801 |
| 1,008,800 | 11/1965 | Great Britain | 74/801 |

Primary Examiner—Henry F. Raduazo
Attorney—Orrin M. Haugen

ABSTRACT: In combination, a centrifugal pump means having an enclosed pumping chamber with an inlet and an outlet, along with an impeller journaled for rotation within the chamber and a drive shaft arranged to provide rotational energy to the impeller; and a power transmission means coupled to the centrifugal pump for driving the drive shaft, the power transmission means having an input coupling for direct mounting onto a tractor power takeoff shaft with the input energy being coupled to the drive shaft for the pump. The power transmission means comprises a planetary gear system with a drive hub coupled to the input coupling, along with a plurality of planetary gears mounted on the drive hub, each gear being fabricated from relatively soft material such as nylon or the like, and journaled for rotation on the drive hub means. A sun gear is in mesh with the planetary gears and is mounted directly on the centrifugal pump drive shaft. A ring gear is in mesh with the plurality of planets, the ring gear being retained within the power transmission housing and arranged for limited arcuate motion within the power transmission housing, the ring gear having an outer cylindrical surface with a plurality of radially extending ribs arranged to fit within arcuate slots formed in the power transmission housing, with resilient pads having tip portions with a relatively large cross section, and shank portions with a reduced cross section, these pads being disposed arcuately laterally on either side of the radially extending ribs on the ring gear and thereby adapted to permit limited relative arcuate motion between the power transmission housing and the ring gear in response to torque loading of the drive shaft.

3,583,825

INVENTORS
HARRY J. SADLER,
RAMON PAREJA

BY Orrin M. Haugen
ATTORNEY

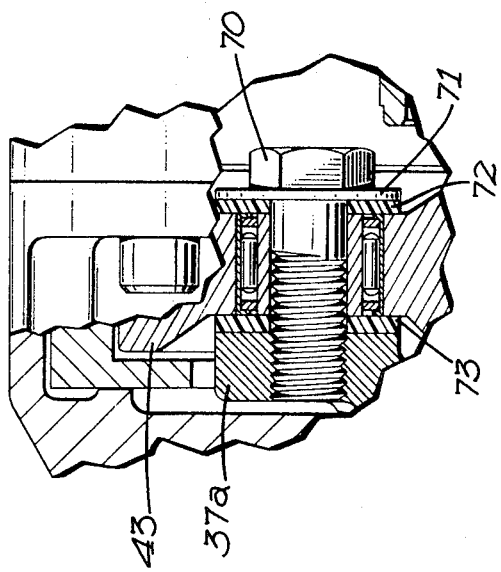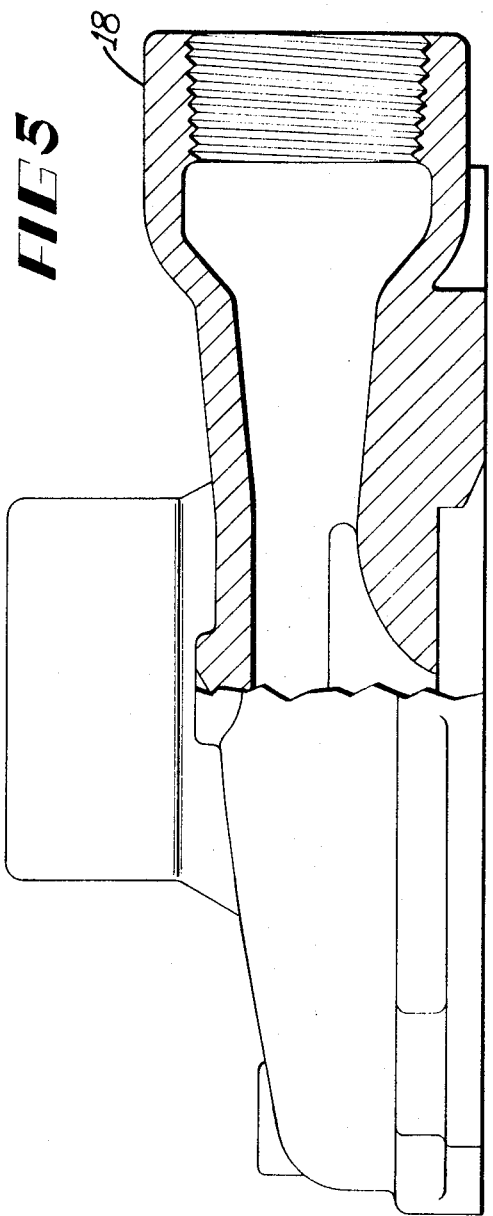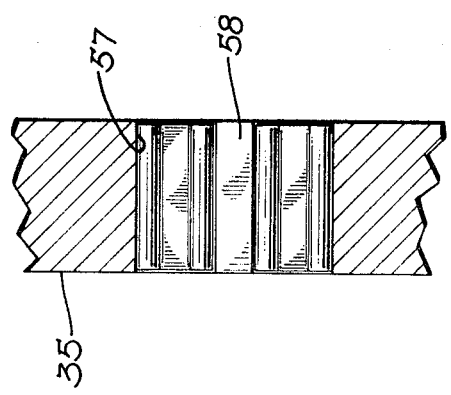

TRACTOR-MOUNTED POWER TAKEOFF DRIVEN CENTRIFUGAL PUMP

The present invention relates generally to a tractor power takeoff mounted centrifugal pump, and more particularly to the combination of such a pump with a planetary drive system adapted to accommodate the mounting of the pump within the conventional volume traditionally available around the power takeoff shaft of farm tractors.

Power takeoff shafts of farm tractors are frequently employed for the pumping of liquids for a variety of reasons. These pumps have traditionally been supplied with power from the power takeoff shaft of the ordinary farm tractor, and in the past these units have frequently utilized belts and the like to transfer the energy from the power takeoff shaft to the pump structure. For convenience and safety in mounting, it is generally desirable that the pump and the drive system for the pump be mounted and retained in the area within the confines of the shield normally employed for this purpose. Shields traditionally employed at the present time have a distance of 4 inches from the spline center to the shield base, and any unit to be received within this area must, of course, have a corresponding diameter or size. With conventional gearing, it has been considered impossible to provide a suitable drive mechanism using normal materials of construction. Therefore, it has been traditional to employ belt drives, or other drives having diameters too large to be received beneath the shield base of the power takeoff shield.

The apparatus of the present invention has been designated to provide a rugged pump with a small diameter housing which easily fits under the power takeoff shield of conventional farm tractors. The system employs a planetary gear drive, the output of which drives a high capacity centrifugal pump. The planetary gear drive, while rugged, is also provided with sacrificial gearing in order to accommodate problems which may arise due to locked rotor situations which can occur in the normal use of this type of pump.

Therefore, it is a principal object of the present invention to provide an improved rugged centrifugal pump having a planetary gear drive capable of being received within the confines of the shielded area provided for the power takeoff shaft of a farm tractor.

It is a further object of the present invention to provide an improved rugged centrifugal pump having high capacity and rugged features, but having sacrificial gearing for accommodating problems which may occur during the normal operation of pumps of this type.

It is yet a further object of the present invention to provide an improved centrifugal pump unit having a power transmission means coupled directly to the centrifugal pump, the power transmission utilizing a planetary gear system having a ring gear mounted for relative arcuate motion within the power transmission housing in response to torque loading of the drive shaft of the centrifugal pump.

Other and further objects of the present invention will become apparent to those skilled in the art upon a study of the following specification, appended claims, and accompanying drawings, wherein:

FIG. 3 is a detail view of the resilient pads and their installation within the assembly, this figure being taken along the line and in the direction of the arrows 3-3 of FIG. 2;

Figure 1:
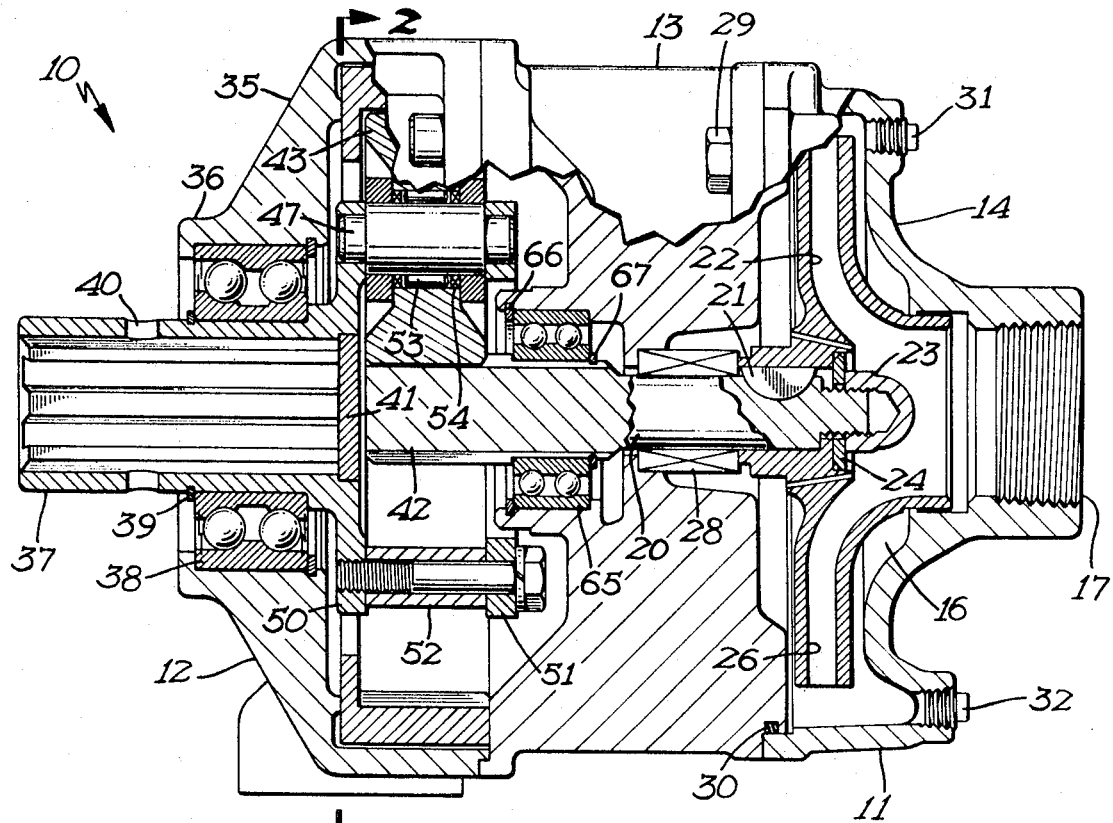
FIG. 1 is a side elevational view of the combined centrifugal pump and power transmission means of the present invention, the structure being shown partially broken away and partially in section.

FIG. 4 is a detail view of the head of the centrifugal pump portion of the apparatus shown in FIG. 1, the head being partially broken away and partially shown in section, and illustrating the details of the inlet and outlet; and FIG. 5 is a detail view, partially in section, of a modified form of mounting for the planetary gear system, this mounting being accomplished with the driving hub only, and without the need of an outer retaining ring.

In accordance with the preferred modification of the present invention, the combined centrifugal pump and drive generally designated 10 includes a pump portion 11 along with a power transmission portion 12. The pump portion 11 includes a housing portion 13 along with a head 14, thus providing a pumping chamber 16, the chamber being provided with an inlet as at 17, and an outlet as at 18. Outlet 18 is shown best in FIG. 4. The pump portion 11 is provided with a drive shaft 20 having a key 21 coupling the shaft to the impeller 22, nut 23 along with washer 24 being utilized to retain the impeller 22 on the shaft 20, and in sealed relationship therewith. The impeller 22 is provided with conventional blades and the like such as are shown at 26, the operation of this pump being conventional and therefore not unusual. A mechanical seal 28 is employed to prevent leakage of fluids being pumped to the atmosphere. Conventional cap screws or the like as shown at 29 are preferably employed to retain the head 14 on the housing portion 13, conventional O-rings such as are shown at 30 being utilized to seal the pumping chamber 16 from the atmosphere. For accommodating drainage of the pumping chamber 16, a pair of drain plugs are provided as shown at 31 and 32, these being conveniently removed when it is desired to drain the system.

Figure 2:
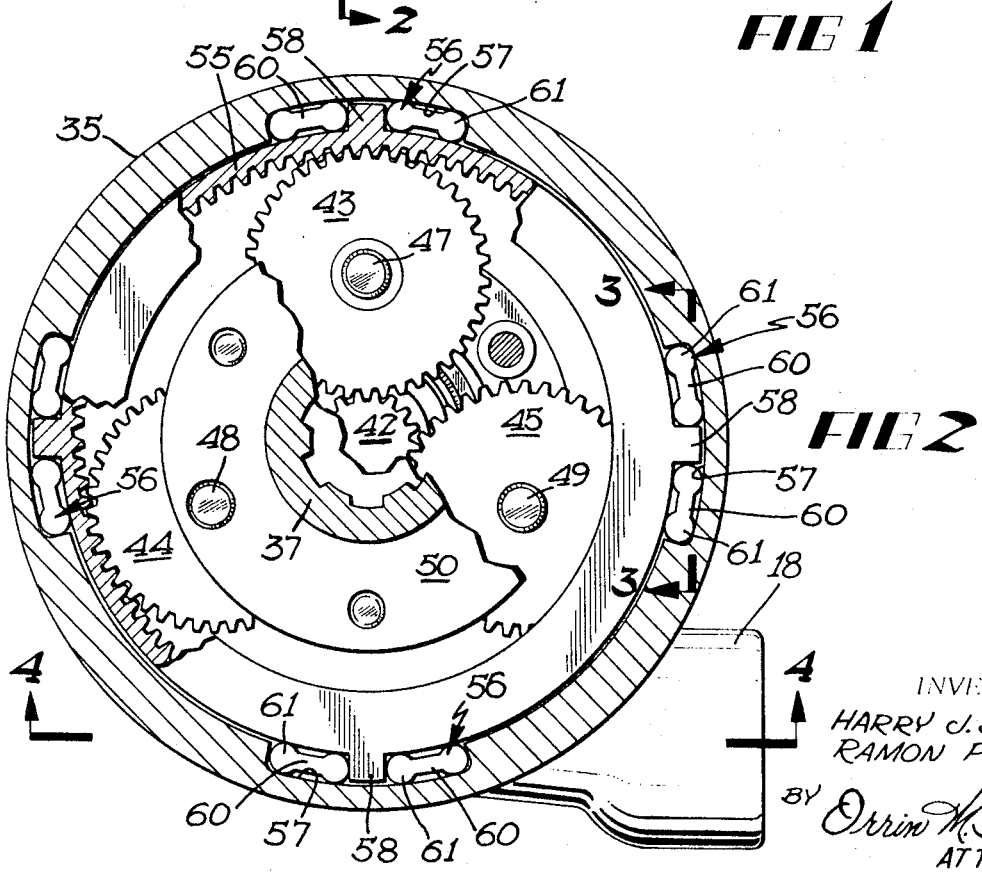
FIG. 2 is a vertical sectional view taken along the line and in the direction of the arrows 2-2 of FIG. 1.

Attention is now directed to the power transmission means or portion shown at 12, the power transmission means being coupled to the body portion 13, and including the body 35 having boss area 36 formed therein for accommodating the shaft 37 in journaled relationship therewith. Bearings are provided as at 38 for accommodating rotation of shaft 37 within the boss 36, the bearings being retained by a snapring or the like as at 39. The shaft 37 is adapted for direct mounting onto the power takeoff shaft of conventional tractors, this shaft therefore being a hollow spline shaft having the splined configuration such as is shown in FIG. 2. For controlling axial disposition of the pump, some splined power takeoff shafts are provided with transverse or diametrical bores, and accordingly shaft 37 may be provided with such bores as at 40.

A dust or dirt seal is provided at 41 for preventing the inflow of dust, grit, or the like into the planetary gear system shown in greatest detail in FIG. 2. This planetary gear system includes a sun gear as at 42, along with three planetary gears 43, 44, and 45. These planetary gears are mounted for rotation on the individual shafts 47, 48, and 49 respectively, the entire planetary gear assembly being in turn mounted upon the drive hub means 50. Drive hub means 50 is integral with shaft 37, and accordingly rotates therewith. With particular attention being directed to the drive portion 12 of FIG. 1, it will be seen that the drive hub means 50 includes an outer ring member 51 which provides a convenient mounting plate for the individual planetary gear-carrying shafts. As is indicated in FIG. 2, these shafts may carry an external bushing as at 52, and needle bearings or the like may be provided as at 53 to accommodate rotation of the individual planetary gears 43, 44, and 45. When these needle bearings are utilized, suitable seals such as is shown at 54 may be employed.

The planetary gears are in mesh with a ring gear 55, ring gear 55 being seated within housing 35, and controlled for modest relative arcuate rotation with housing 35 by means of the resilient pads such as are shown at 56—56. These resilient pads are mounted within the chamber area slots 57 formed within housing 35, and about the radially extending ribs 58—58 which are formed on the exterior cylindrical surface of the ring gear. It will be observed that the individual resilient pads 56—56 are formed in a "dog-bone" configuration, with the tip portions having a cross section substantially equal to the depth of the slots 57—57, while the shank portions such as at 60 are of a lesser cross-sectional dimension. The tip portions, such as are shown at 61, for example, have a cross section which is at least equal to the radial depth of the slots 57 so as to provide a snug or firm fit between the exterior of the ring gear 55 and the interior of the housing 35. The center portions of the resilient pads 56, such as at 60, being of reduced cross-sectional dimension, permit limited arcuate motion between the ring gear 55 and the housing 35, this relative motion occurring in response to changes in torque loading of the drive shaft during operation of the unit.

GEAR DESIGN

In the design of the structure, particularly the structure capable of being received within the confines of the shield of the power takeoff shaft of a tractor, the torque loading was initially determined. It was ascertained that at a speed of 600 r.p.m., the maximum torque loading would have a peak of about 945 inch-pounds. This would be on normal application of the pump. The maximum horsepower required for the pump during its worst operating condition would be in the range of about 7.2 horsepower. It was accordingly ascertained that with nylon molded gears, a pitch diameter of 16 would be necessary in order to accommodate this anticipated loading. Other plastic substances, such as polyesters, urethanes, polyolefins such as polyethylene and polypropylene may be used, with similar determinations of pitch diameter being obtained. Furthermore, it was anticipated that the centrifugal pump to be operated by this unit should have a rotational velocity of about 4,200 r.p.m., in order to accommodate the normal requirements of a pump of this type. With a 6 inch ring gear utilizing teeth with a pitch diameter of 16, a total of 96 teeth would be employed. In order to obtain a 7:1 speed ratio for a power takeoff shaft operating at 600 r.p.m., it was ascertained that a sun gear having 16 teeth would be required. This was consistent with the 1-inch shaft utilized for the impeller 22 of the centrifugal pump portion. Unfortunately, the arrangement, while providing the necessary rotational velocity, provides a sun gear having 16 teeth, and since 16 is not divisible by three, conventional spacing of the individual planetary gears was not possible. Therefore, a modified arrangement was selected wherein two of the individual planetary gears were spaced at an arcuate distance of 112° 30', the other being spaced at an arcuate distance of 135°. Thus, the planetary gear teeth are disposed in an isosceles triangular configuration, the arrangement providing for suitable handling of the torque in the system. Appropriate mesh of the individual gear teeth is possible with this system.

It was ascertained that if a larger pitch diameter was utilized, such as, for example, 12 or 14, then the mechanism became too large and cumbersome to be accommodated within the shield of the power takeoff mechanism.

With the arrangement as selected, planetary gears having 40 teeth each could be conveniently employed, and such gears, while available commercially, provide appropriate results.

As an alternative, some commercially available farm tractors have a power takeoff shaft operating at a speed of 1,000 r.p.m. In this device, the same reasoning may apply with a somewhat different result obtained, that is, a 2-inch sun gear along with 2-inch planetary gears being employed. These devices will also utilize a pitch diameter of 16, thus being consistent with the ordinary operational characteristics of the structure.

Particular attention is now directed to FIG. 5 of the drawings wherein a modified form of planetary gear mounting is illustrated. In this view, the planetary gear 43 is coupled onto the flange of drive hub means 50 by means of bolt 70, a metallic washer 71 and a pair of plastic washers 72 and 73. Suitable bearings may be employed internally of the gear 43, if desired.

RESILIENT PAD DESIGN

The resilient pad members 56—56 are preferably made from a relatively firm rubber, preferably of about 60—70 durometer, although other durometer materials may be utilized for unusual operation. This will provide sufficient resiliency and sufficient firmness to protect the mechanism against damage due to sudden shock loading, and will also accommodate a modest amount of relative arcuate rotation between the ring gear 55 and the housing 35. In order to assist the mechanism in accommodating this relative arcuate rotation while maintaining alignment, a second bearing structure is provided as at 65, this bearing being retained, for example, by snap rings 66 and 67, and appropriately guiding the axis of the shaft 20.

GENERAL CONSIDERATIONS

No unusual materials of construction are required, it being possible to obtain results with commercially available gearing and the like. The impeller, if use with unusual fluids or liquids is deemed possible, is preferably fabricated from plastic or the like.

It will be appreciated that the structure shown herein is shown for illustrative purposes only, and various modifications may be employed within the aspects of this invention.

What we claim is:

1. In combination:
   a centrifugal pump means having an enclosed pumping chamber with an inlet and an outlet, an impeller journaled for rotation within said chamber and a drive shaft arranged to provide rotational energy to said impeller; and a power transmission means coupled to said centrifugal pump means for driving said drive shaft, said power transmission means being mounted within a housing and having an input coupling for direct mounting onto a tractor power takeoff shaft with the input thereof being coupled to said drive shaft;
   a. said power transmission means comprising a planetary gear system with drive hub means coupled to said input coupling;
   b. a plurality of planetary gear retaining shafts coupled to said drive hub means, each with a sacrificial planetary gear secured for journaled rotation thereon, and a sun gear in mesh with said plurality of planetary gears and being coupled to said drive shaft;
   c. ring gear means in mesh with said plurality of planetary gears retained within said power transmission housing and arranged for limited arcuate motion within said power transmission housing, said ring gear means having an outer cylindrical surface with a plurality of radially extending ribs arranged to fit within arcuate slots of a certain predetermined radial dimension and formed in said power transmission housing, and
   d. resilient pads having tip portions with a cross section substantially equal to said certain predetermined radial dimension and with a central shank portion having a cross-sectional thickness substantially less than said predetermined radial dimension received within said arcuate slots and disposed arcuately laterally on either side of said radially extending rib and adapted to permit limited relative arcuate motion between said power transmission housing and said ring gear in response to torque loading of said drive shaft.

2. The combination as defined in claim 1 wherein said planetary gears are spaced at three arcuate points forming an isosceles triangle on said drive hub means.

3. The combination as defined in claim 2 being particularly characterized in that said triangle has included angles of 112° 30', 112° 30' and 135° respectively.

4. The combination as defined in claim 1 being particularly characterized in that said planetary gears are formed of molded nylon.

5. The combination as defined in claim 1 being particularly characterized in that said power transmission housing is provided with four arcuate slots for receiving said resilient pads, said arcuate slots being disposed at 90°, one from another.